A United States Patent

US012153898B1

(12) United States Patent
Kim et al.

(10) Patent No.: US 12,153,898 B1
(45) Date of Patent: Nov. 26, 2024

(54) METHOD AND SYSTEM FOR WEIGHT MEMORY MAPPING FOR STREAMING OPERATION OF GIANT GENERATIVE ARTIFICAL INTELLIGENCE HARDWARE

(71) Applicant: HyperAccel Co., Ltd., Hwaseong-si (KR)

(72) Inventors: Junsoo Kim, Hwaseong-si (KR); Jung-Hoon Kim, Hwaseong-si (KR); Junseo Cha, Hwaseong-si (KR)

(73) Assignee: HyperAccel Co., Ltd., Hwaseong-si (KR)

( * ) Notice: Subject to any disclaimer, the term of this patent is extended or adjusted under 35 U.S.C. 154(b) by 0 days.

(21) Appl. No.: 18/744,211

(22) Filed: Jun. 14, 2024

(30) Foreign Application Priority Data

Jun. 16, 2023 (KR) ........................ 10-2023-0077569

(51) Int. Cl.
*G06F 7/544* (2006.01)
*G06F 17/14* (2006.01)
*G06F 17/16* (2006.01)

(52) U.S. Cl.
CPC ............ *G06F 7/5443* (2013.01); *G06F 17/14* (2013.01); *G06F 17/16* (2013.01)

(58) Field of Classification Search
CPC ......... G06F 7/5443; G06F 17/14; G06F 17/16
USPC ........................................................ 708/190
See application file for complete search history.

(56) References Cited

U.S. PATENT DOCUMENTS 11,748,625 B2 * 9/2023 Korthikanti ............ G06N 3/063
706/25
11,803,736 B1 * 10/2023 Meyer .................... G06F 9/3013

FOREIGN PATENT DOCUMENTS

| KR | 10-2020-0143686 | 12/2020 |
| KR | 10-2021-0053175 | 5/2021 |
| KR | 10-2022-0164573 | 12/2022 |

OTHER PUBLICATIONS

Decision to Grant a Patent mailed Nov. 10, 2023, issued in corresponding Korean Application No. 10-2023-0077569, filed Jun. 16, 2023, 6 pages.
Request for the Submission of an Opinion mailed Aug. 24, 2023, issued in corresponding Korean Application 10-2023-0077569, filed Jun. 16, 2023, 4 pages.

* cited by examiner

*Primary Examiner* — Tan V Mai
(74) *Attorney, Agent, or Firm* — Christensen O'Connor Johnson Kindness PLLC

(57) ABSTRACT

Provided is a method and system for weight memory mapping for a streaming operation of giant generative artificial intelligence hardware. A weight memory mapping system may include a weight memory configured to store a weight matrix for a pretrained artificial intelligence model; an input register configured to store a plurality of input data; a first hardware operator configured to process a matrix multiplication operation between the plurality of input data and the weight matrix and to compute a lane-level final sum during the progress of the matrix multiplication operation by reusing a partial sum of the matrix multiplication operation; and a second hardware operator configured to preprocess a next matrix multiplication operation during the progress of the matrix multiplication operation using the final sum.

16 Claims, 18 Drawing Sheets

(1) All specific positions are preset in the same channel
(2) Assign to adjacent addresses when number of heads is large.

Since it is the same as hardware logic of finding WTE, it is possible to share hardware resources

METHOD AND SYSTEM FOR WEIGHT MEMORY MAPPING FOR STREAMING OPERATION OF GIANT GENERATIVE ARTIFICAL INTELLIGENCE HARDWARE

CROSS-REFERENCE TO RELATED APPLICATION(S)

This application claims the priority benefit of Korean Patent Application No. 10-2023-0077569, filed on Jun. 16, 2023, in the Korean Intellectual Property Office, the disclosure of which is incorporated herein by reference.

BACKGROUND

1. Field of the Invention

Example embodiments relate to a method and system for weight memory mapping for a streaming operation of a giant generative artificial intelligence hardware.

2. Description of the Related Art

In the case of generative artificial intelligence models, many of them adopt a transformer structure and exhibit high performance. However, in the case of a transformer, latency is crucial due to small parallelism of operations. An efficient weight mapping method is required to reduce latency of hardware.

Reference material includes Korean Patent Laid-Open Publication No. 10-2022-0164573.

SUMMARY

Example embodiments may provide a method and system for weight memory mapping for a streaming operation of giant generative artificial intelligence hardware.

Technical subjects of the present invention are not limited to the aforementioned technical subjects and still other technical subjects not described herein will be clearly understood by one of ordinary skill in the art from the following description.

According to an example embodiment, there is provided a weight memory mapping system including a weight memory configured to store a weight matrix for a pretrained artificial intelligence model; an input register configured to store a plurality of input data; a first hardware operator configured to process a matrix multiplication operation between the plurality of input data and the weight matrix and to compute a lane-level final sum during the progress of the matrix multiplication operation by reusing a partial sum of the matrix multiplication operation; and a second hardware operator configured to preprocess a next matrix multiplication operation during the progress of the matrix multiplication operation using the final sum.

According to an aspect, the partial sum may include a result of matrix multiplication between a single column of the weight matrix and the plurality of input data, and the lane-level final sum may include a value of accumulated partial sums as a result of matrix multiplication between each of lane-level columns of the weight matrix and the plurality of input data.

According to another aspect, the first hardware operator may include a plurality of multiply-and-accumulation (MAC) trees configured to process the matrix multiplication operation based on the lane level; a partial sum register configured to store the partial sum of the matrix multiplication operation; and a plurality of partial sum accumulators configured to accumulate partial sums of the partial sum register and to compute the lane-level final sum.

According to still another aspect, each of the number of the plurality of MAC trees and the number of the plurality of partial sum accumulators may correspond to the number of lanes.

According to still another aspect, the second hardware operator may be configured to preprocess the next matrix multiplication operation using the lane-level final sum that is computed by at least one partial sum accumulator among the plurality of partial sum accumulators.

According to still another aspect, the artificial intelligence model may include a transformer model, the weight memory may be configured to store shared weight data for a language modeling (LM) head operation and a token embedding operation for the transformer model as the weight matrix, and the first hardware operator may be configured to read a weight of a specific column of the weight memory and process the token embedding operation when performing the token embedding operation.

According to still another aspect, the weight memory mapping system may further include a preprocessing routing unit configured to adjust positions of values of the weight matrix stored in the weight memory before the matrix multiplication operation such that values required for a next operation of the matrix multiplication operation are adjacent to each other.

According to still another aspect, the artificial intelligence model may include a transformer model, and the next operation may include a rotary embedding operation for the transformer model.

According to still another aspect, the artificial intelligence model may include a transformer model, and the weight memory mapping system may further include a rotary embedding parameter processing unit configured to quantize each of a sine value and a cosine value of a single position of a rotary embedding parameter for a rotary embedding operation of the transformer model to 8 bits of a fixed point and then store a set of the quantized sine value and cosine value packed into 16 bits in the weight memory.

According to still another aspect, the rotary embedding parameter processing unit may be configured to store the set in the weight memory according to a channel that is determined using a value acquired by dividing a position of the set by the number of channels and a head number and an address that is determined using a remainder acquired by dividing the position of the set by the number of channels or to read the set from the weight memory.

According to an example embodiment, there is provided a weight memory mapping method including storing a weight matrix for a pretrained artificial intelligence model in a weight memory; storing a plurality of input data in an input register; processing a matrix multiplication operation between the plurality of input data and the weight matrix and computing a lane-level final sum during the progress of the matrix multiplication operation by reusing a partial sum of the matrix multiplication operation through a first hardware operator; and preprocessing a next matrix multiplication operation during the progress of the matrix multiplication operation using the final sum through a second hardware operator.

Specific details of other example embodiments are included in the detailed description and drawings.

According to some example embodiments, it is possible to provide a method and system for weight memory mapping for a streaming operation of giant generative artificial intelligence hardware.

Effects of the present invention are not limited to the aforementioned effects and still other effects not described herein will be clearly understood by one of ordinary skill in the art from the following description.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
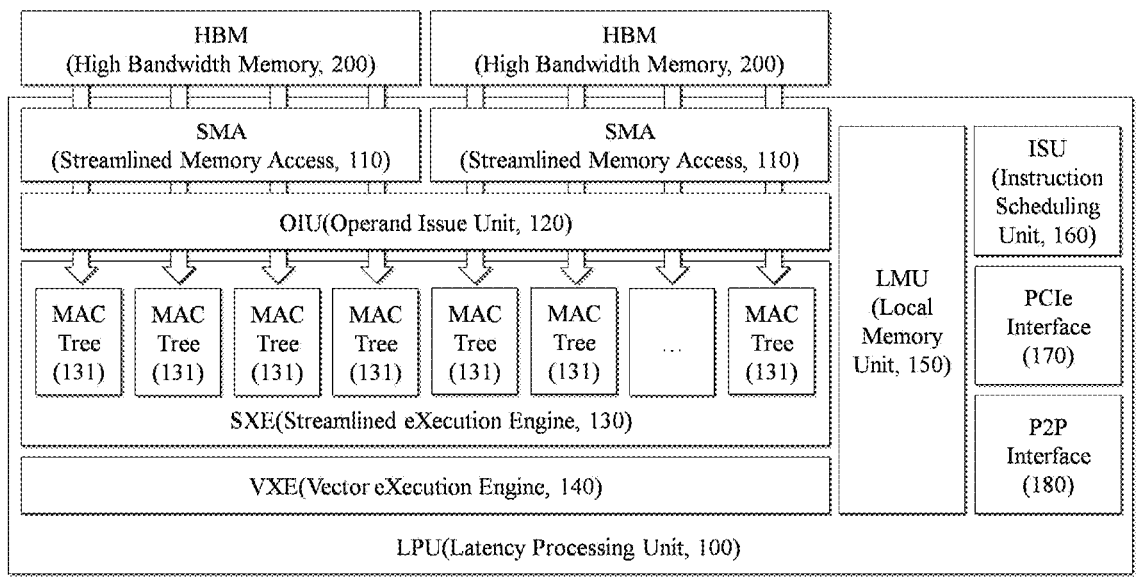
FIG. 1 illustrates an example of a structure of a latency processing unit according to an example embodiment.

Advantages and features of the present invention and methods to achieve the same will become clear with reference to example embodiments described in detail along with the accompanying drawings. However, the present invention is not limited to example embodiments disclosed blow and may be implemented in various forms. Here, the example embodiments are provided to make the disclosure of the present invention complete and to fully inform one of ordinary skill in the art to which the present invention pertains of the scope of the present invention and the present invention is defined by the scope of the claims. Like reference numerals used herein refer to like elements throughout.

When it is described that one component is "connected to" or "coupled to" another component, it may be understood that the one component is directly connected to or coupled to the other component or that still other component is interposed between the two components. In contrast, it should be noted that when it is described that one component is "directly connected to" or "directly coupled to" to another component, still other component may not be present therebetween. As used herein, the expression "and/or" includes any one and any combination of the associated listed items.

The terms used herein are to explain the example embodiments and not to be limiting of the present invention. Herein, the singular forms "a," "an," and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, and/or elements.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present invention.

Unless otherwise defined herein, all terms used herein (including technical or scientific terms) have the same meanings as those generally understood by one of ordinary skill in the art. Also, terms defined in dictionaries generally used should be construed to have meanings matching contextual meanings in the related art and are not to be construed as an ideal or excessively formal meaning unless otherwise defined herein.

FIG. 1 illustrates an example of a structure of a latency processing unit according to an example embodiment.

Referring to FIG. 1, a latency processing unit (LPU) 100 according to an example embodiment may include a streamlined memory access (SMA) 110, an operand issue unit (OIU) 120, a streamlined execution engine (SXE) 130, a vector execution engine (VXE) 140, a local memory unit (LMU) 150, an instruction scheduling unit (ISU) 160, a peripheral component interconnect express (PCIe) interface 170, and a peer-to-peer (P2P) interface 180.

The SMA 110 may be a special direct memory access (DMA). For example, the SMA 110 may connect all channels (e.g., 32 channels) of high bandwidth memory (HBM) 200 to an execution engine (e.g., SXE 130) and may transmit FP16 (half precision floating point) data at a maximum bandwidth. The SMA 110 may be designed as deep first in first out (FIFO) to transmit consecutive memory requests based on a pre-loaded memory (MEM) instruction. Memory mapping considering hardware may reduce a latency by eliminating matrix change or transposition task. Therefore, the SMA 110 may stream data received with a maximum burst size to an execution engine with a minimum latency. The SMA 110 may efficiently execute transpose of a matrix using a strobe signal. Streaming data may include a parameter for vector matrix execution (e.g., weight, bias) and other vector-related execution (e.g., gamma/beta, embedding).

The OIU 120 may adjust data streamed from the SMA 110 (e.g., first operand) and input from an on-chip memory (e.g., second operand) before issuance to the execution engine. Based on an execute (EXE) instruction, the OIU 120 may generate a microcode that configures the execution engine and determines a target engine of operand. Also, the OIU 120 may include a reuse buffer to eliminate a read idle time of static operand (e.g., input vector) and an asymmetric buffer to maintain vectorized data used as a scalar (e.g., bias). Therefore, an appropriate operand is almost always prefetched and ready to be issued immediately to the execution engine.

The SXE 130 refers to main computing hardware of the LPU 100 and may be designed to make the full use of an incoming bandwidth to execute vector-matrix multiplication (V·M), such as attention, 1D convolution, and feedforward network. The SXE 130 may include the number of multiply-and-accumulation (MAC) trees 131 capable of matching a reception bandwidth and an operation bandwidth of the HBM 200. For example, when 1024 elements are received every cycle from the HBM 200, the reception bandwidth and the operation bandwidth may be matched through 16 MAC trees 131 each having 64 input vectors. The MAC trees 131 each having 64 input vectors may include 64 multipliers and 63 adders.

The plurality of MAC trees 131 may perform a matrix multiplication operation, and may be connected for each channel through the HBM 200 and the SMA 110. In detail, one of the plurality of MAC trees 131 may be connected to the HBM 200 through a single channel and may maximize a transmission bandwidth between the LPU 100 and the HBM 200 and may perform a matrix multiplication operation required for a very large artificial intelligence model without bottlenecking. Therefore, the number of the plurality of MAC trees 131 and the number of memory channels of the HBM 200 may be configured to be the same.

A matrix multiplication operation result of the plurality of MAC trees 131 may be provided to the VXE 140. The VXE 140 may be implemented using a custom low-latency arithmetic logic unit (ALU) and may execute a vector operation, such as token embedding, softmax, normalization, and residual operation. Since this vector operation relatively infrequently occurs, the OIU 120 may adjust fan-in to this path to reduce hardware resources with negligible performance. The VXE 140 may be provided with an operation result of the plurality of MAC trees 131 and may perform a subsequent operation by receiving an activation value from the LMU 150. The VXE 140 may be configured to include various operator combinations by including a plurality of multi-function operation interfaces.

The LMU 150 may deliver the activation value to the plurality of MAC trees 131 and the VXE 140. Here, the LMU 150 may copy and transmit the activation value to deliver the same activation value to the plurality of MAC trees 131. Also, the LMU 150 may store result values operated by the plurality of MAC trees 131 and the VXE 140. That is, the LMU 150 may function within the LPU 100 as an internal buffer corresponding to the HBM 200. Here, in a matrix multiplication operation, the LPU 100 may store an activation value with a high reuse rate or a parameter of a model in the LMU 150 and may store a weight with a low reuse rate in the HBM 200. The LMU 150 may be implemented as a 4 MB multi-bank register file with scalar vector separation for fast, high-bandwidth access of input, output, and intermediate data. Also, the LMU 150 may be a multi-port that simultaneously supports read and write in a write-store stage of the execution engine and the OIU 120.

The ISU 160 may control the overall execution flow of the LPU 100. The ISU 160 may employ a parallel instruction chaining (PIC) method and may consecutively execute dependent instructions using instruction chaining. Since PIC classifies instructions that require independent hardware into a group of dependent instructions (e.g., memory (MEM) instruction, execution (EXE) instruction, network (NET) instruction), all instructions may be executed in parallel with an instruction chain of each group, which may lead to achieving low control overhead and latency saving. Also, the ISU 160 may update a control register (e.g., token and layer number) for engine execution. An internal scheduler may support out-of-order execution of the SXE 130 and the VXE 140 to maximize hardware utilization and a powerful scoreboard may be designed to handle data risk. For example, the ISU 160 may perform scheduling such that the plurality of MAC trees 131 and the VXE 140 may simultaneously perform an operation. Also, by pre-executing an instruction without dependency to maximize a parallel operation, the ISU 160 may minimize an idle time of each operating device and a memory access device and may improve computational throughput and latency accordingly.

The LPU 100 may be connected to a host computer through the PCIe interface 170, may perform an operation by receiving an instruction required for operating the LPU 100, an input value of a very large artificial intelligence model, and a weight from the host computer and then may deliver the result thereof to the host computer.

The LPU 100 may be scaled out to a cluster of the plurality of LPUs connected through the P2P interface 180. The scaled-out cluster structure may further improve acceleration of an operation of the very large artificial intelligence model.

FIGS. 2 to 5 illustrate examples of implementation models of latency processing units (LPUs) according to example embodiments. The foregoing example embodiment of FIG. 1 describes an example of an implementation model using an external memory of the HBM 200. Instead of the HBM 200, a double data rate (DDR) may be used as the external memory. Here, a large model may not be stored in a single device and so, may be separated into a plurality of partitions, and may be stored in external memories for a plurality of devices (plurality of LPUs) by partition. In this case, synchronization between the plurality of devices may be required for inference of the large model.

Figure 2:
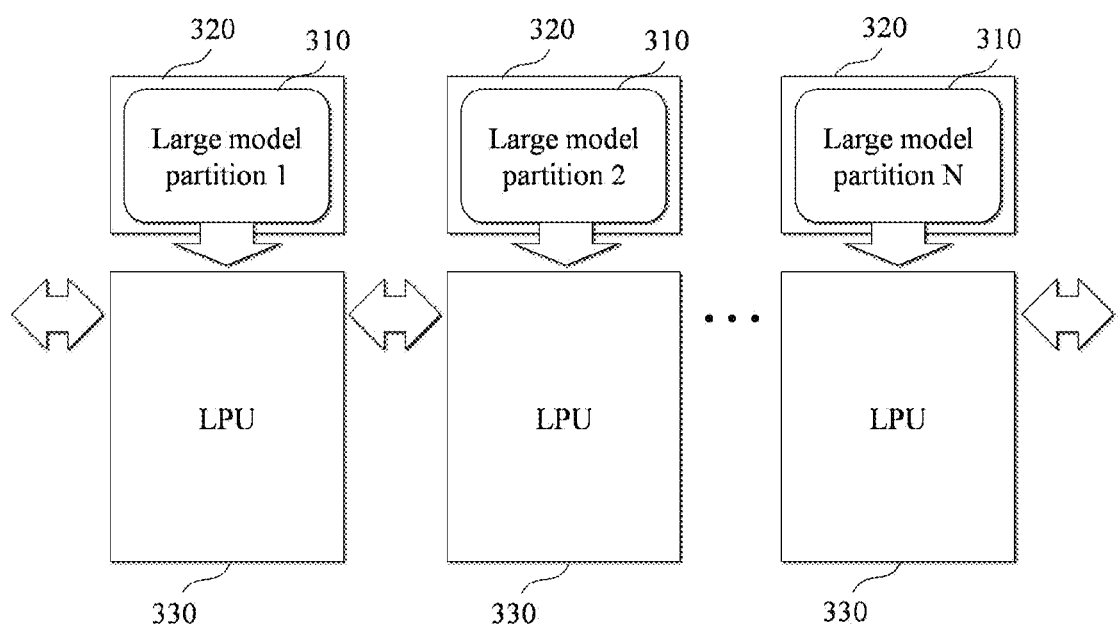
FIGS. 2 to 5 illustrate examples of implementation models of latency processing units (LPUs) according to example embodiments.

Similar to the example embodiment of FIG. 1, the example embodiment of FIG. 2 illustrates a plurality of external memories 320 configured to store a plurality of partitions 310 of a large model and a plurality of LPUs 330 connected in parallel to the plurality of external memories 320. A single LPU may be implemented in a single field programmable gate array (FPGA) and a single partition may be connected in parallel to a single FPGA. A transformer structure includes multi-head attention, layer normalization, feed forward, etc., in a decoder layer and may model-parallelize multi-head attention and feed forward. In this case, when multi-head attention is terminated, a single embedding vector may be output as a result. Since a single device has only a embedding vector portion, a plurality of devices needs to share each embedding vector to move on to a next operation and synchronization may be required accordingly. Here, considering scalability, a single LPU may be implemented with a plurality of external memories (e.g., two or four). For example, the example embodiment of FIG. 1 shows an example of using two HBMs 200 each in which a single partition is stored.

Figure 3:
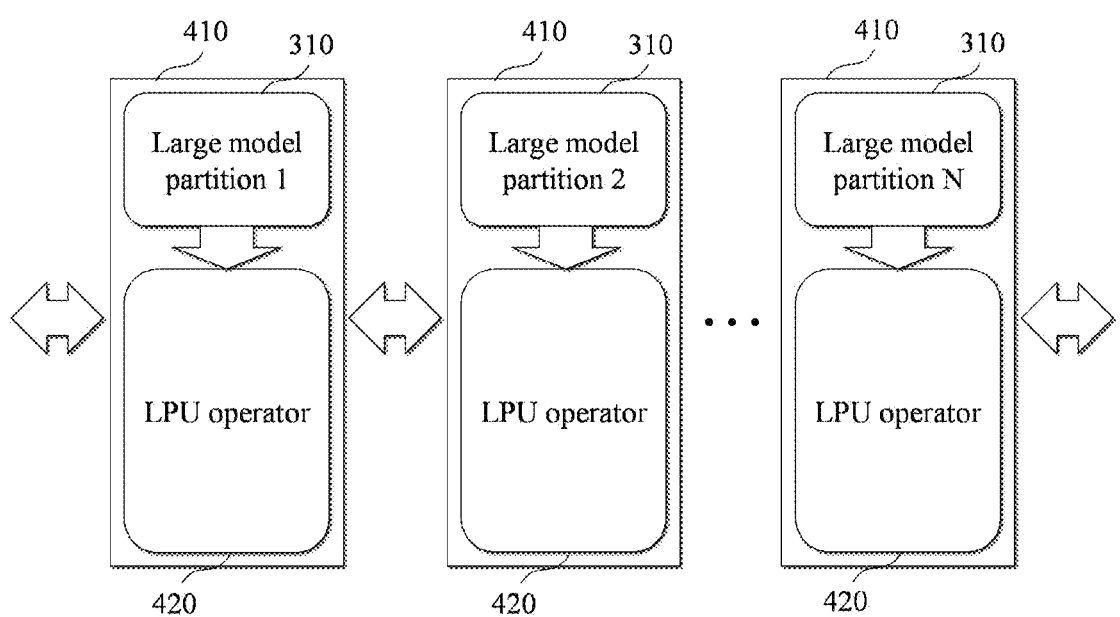

The example embodiment of FIG. 3 is an example of a processing-in-memory (PIM) model and shows an example in which a single LPU is implemented as a PIM chip and both a partition and an LPU operator are integrated into a single chip. The example embodiment of FIG. 3 illustrates a plurality of LPUs 410, a plurality of partitions 310, and a plurality of LPU operators 420, which may each be implemented with a single PIM chip. Here, each of the plurality of LPUs 410 may include a single partition 310 and a single LPU operator 420.

Figure 4:
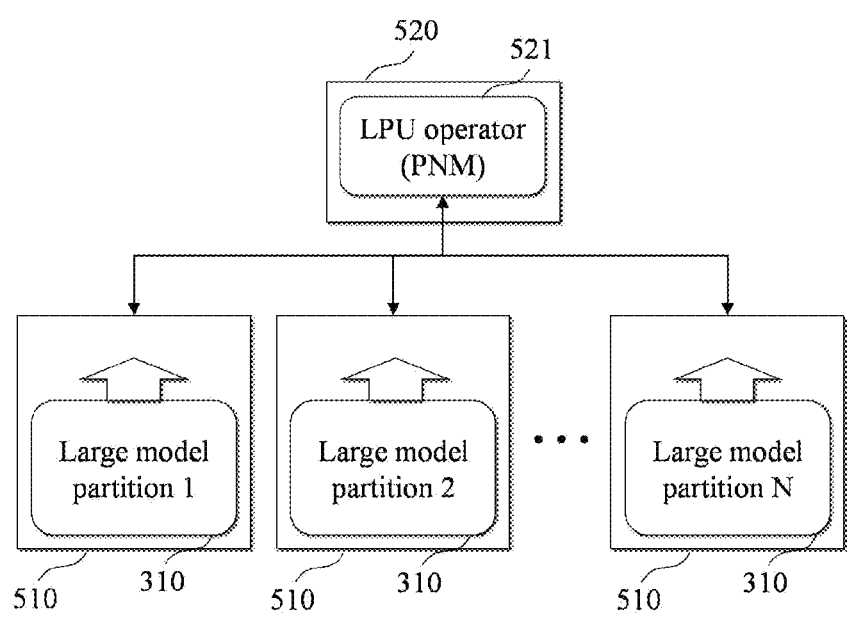

The example embodiment of FIG. 4 shows an example of a processing-near-memory (PNM) model. It may be difficult to include a configuration for processing all LPU operations in a single PIM chip. The example embodiment of FIG. 4 shows a model that stores the plurality of partitions 310 in a plurality of memory chips 510, respectively, and includes an LPU operator 521 for an LPU operation in a buffer chip 520, such as a PNM chip.

Figure 5:
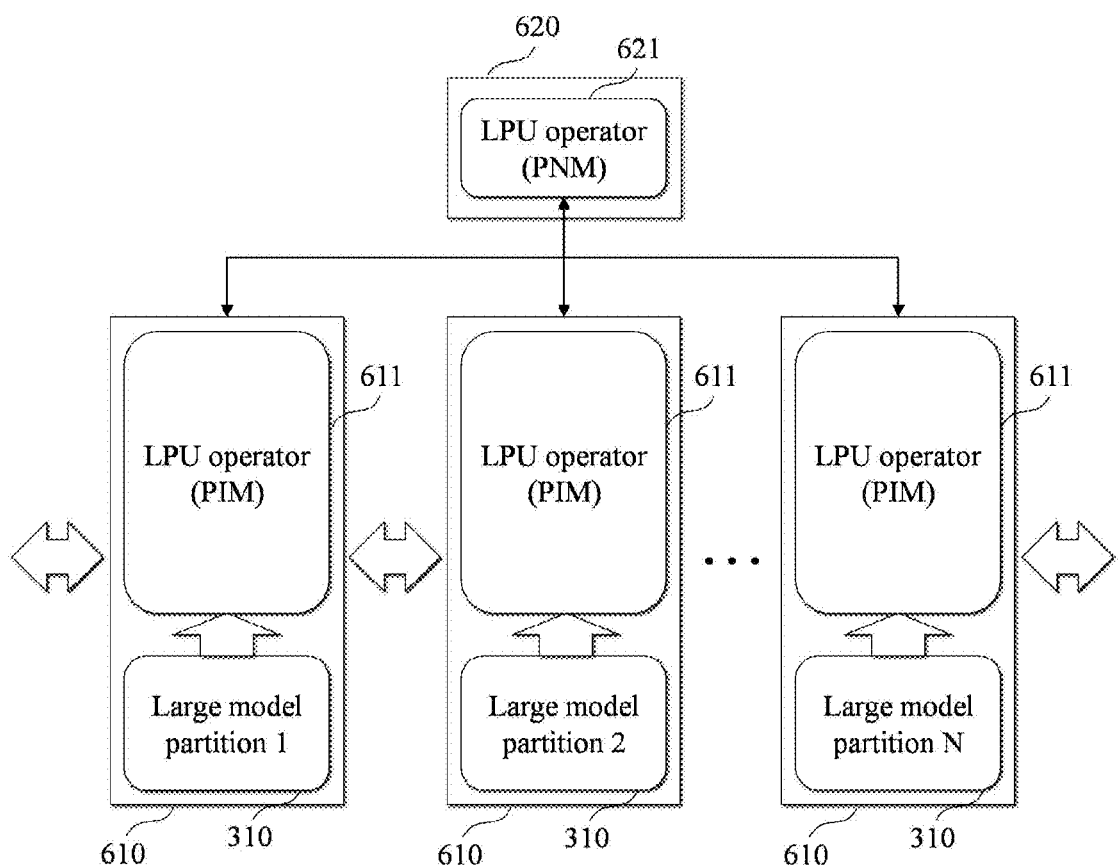

The example embodiment of FIG. 5 shows an example of a model in which PIM and PNM are combined. For example, the plurality of partitions 310 may be stored in a plurality of memory chips 610, respectively. Also, a PIM-type LPU operator 611 may be implemented in each of the plurality of memory chips 610, as an accumulator such as a MAC tree. Here, an LPU operator 621 for the remaining high-level operation of LPU may be implemented in a buffer chip 620 using a PNM method.

Figure 6:
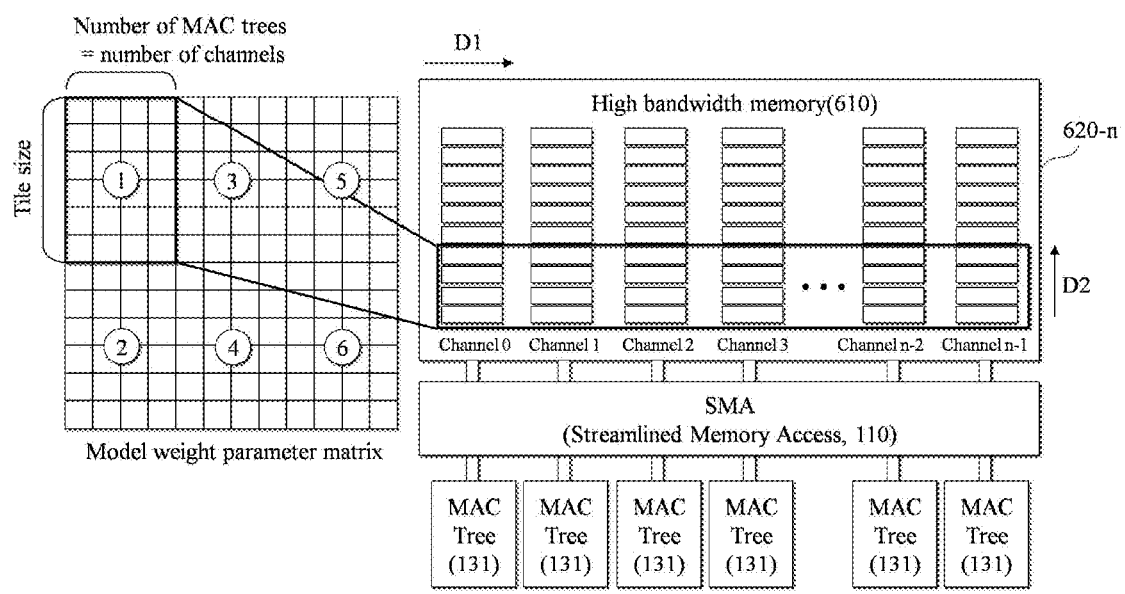
FIG. 6 illustrates an example of describing weight matrix data mapping of a high bandwidth memory for a matrix multiplication operation of a latency processing unit according to an example embodiment.

FIG. 6 illustrates an example of describing weight matrix data mapping of a high bandwidth memory for a matrix multiplication operation of a latency processing unit according to an example embodiment.

Referring to FIG. 6, the LPU 100 according to the example embodiment may store mapped weight matrix data in the high bandwidth memory 610, such as the HBM 200, to make it possible to load weight data without accessing other memory channels during a matrix multiplication operation of each MACT tree, based on the fact that the number of the plurality of MAC trees 131 and the number of memory channels of the SMA 110 are the same.

In detail, weight matrix data may be stored in the high bandwidth memory 610 to be mapped to each channel 620-$n$ as many as the number of the plurality of MAC trees 131 in a column direction (D1) of the weight matrix. Since matrix multiplication operations may be performed in parallel in the column direction of the weight matrix, the plurality of MAC trees 131 may read column direction data from each allocated memory channel 620-$n$ and may perform the matrix multiplication operation.

Then, the plurality of MAC trees 131 may map the weight matrix data such that a final operation result may be completed through accumulation in a row direction D2 of the weight matrix. The number of row data to be mapped at a time may be determined by a bandwidth of the high bandwidth memory 610, which may be determined by a tile size that the plurality of MAC trees 131 may process at a time.

Figure 7:
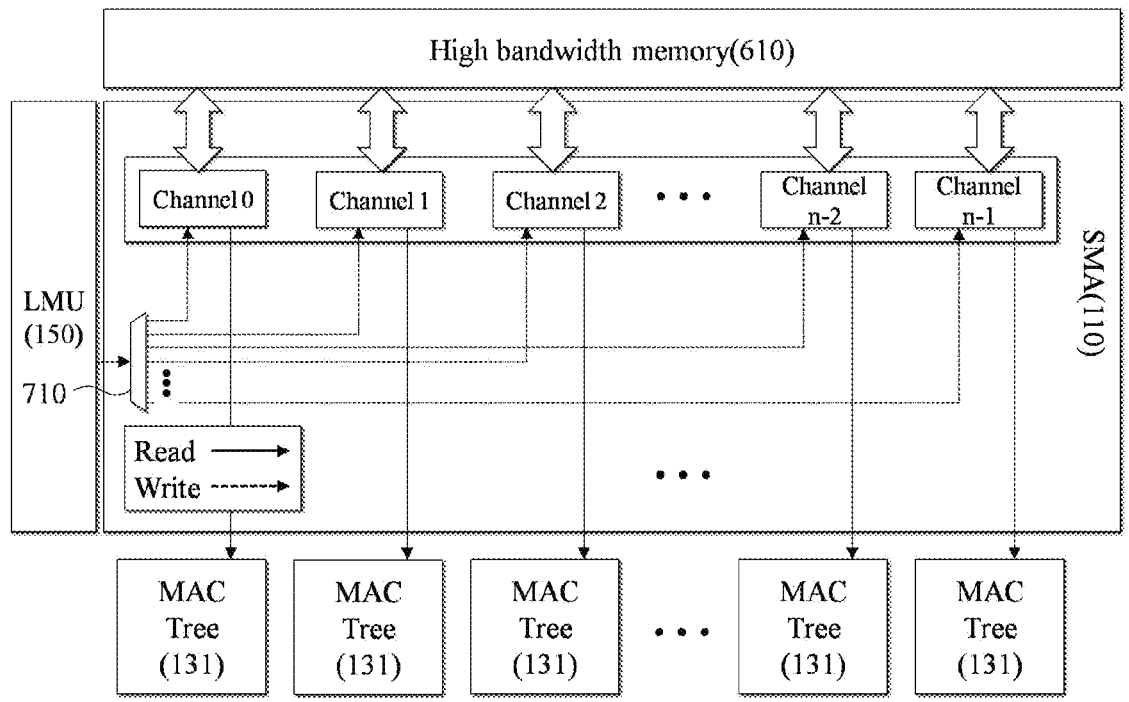
FIG. 7 illustrates an example of a high bandwidth memory interface included in a latency processing unit according to an example embodiment.

FIG. 7 illustrates an example of a high bandwidth memory interface included in a latency processing unit according to an example embodiment.

Referring to FIG. 7, the SMA 110 may connect the LMU 150, the plurality of MAC trees 131, and the high bandwidth memory 610. Since the SMA 110 is not connected to other operating devices of the LPU 100, a high bandwidth memory interface may be minimized in terms of hardware resources.

The plurality of MAC trees 131 and the memory channels 620-$n$ may be connected to each other based on a one-to-one correspondence. That is, each of the plurality of MAC trees 131 does not need to access channels other than a directly assigned channel and accordingly, may perform a matrix multiplication operation without using a complex interface that uses many resources and has a high latency, for example, a cross-bar.

The SMA 110 may configure only a read interface that allows the plurality of MAC trees 131 to retrieve and read weight matrix data stored in the high bandwidth memory 610. That is, as described below, since an operation result is stored in the high bandwidth memory 610 through the LMU 150, a write interface for the high bandwidth memory 610 of the plurality of MAC trees 131 is not configured and corresponding hardware resources may be reduced accordingly.

In contrast, the SMA 110 may configure only a write interface between the LMU 150 and the high bandwidth memory 610. An operation result stored in the LMU 150 as an internal buffer through the SMA 110 may be transmitted to be recorded in the high bandwidth memory 610 and a memory channel for recording may be selected using a demultiplexer 710.

Figure 8:
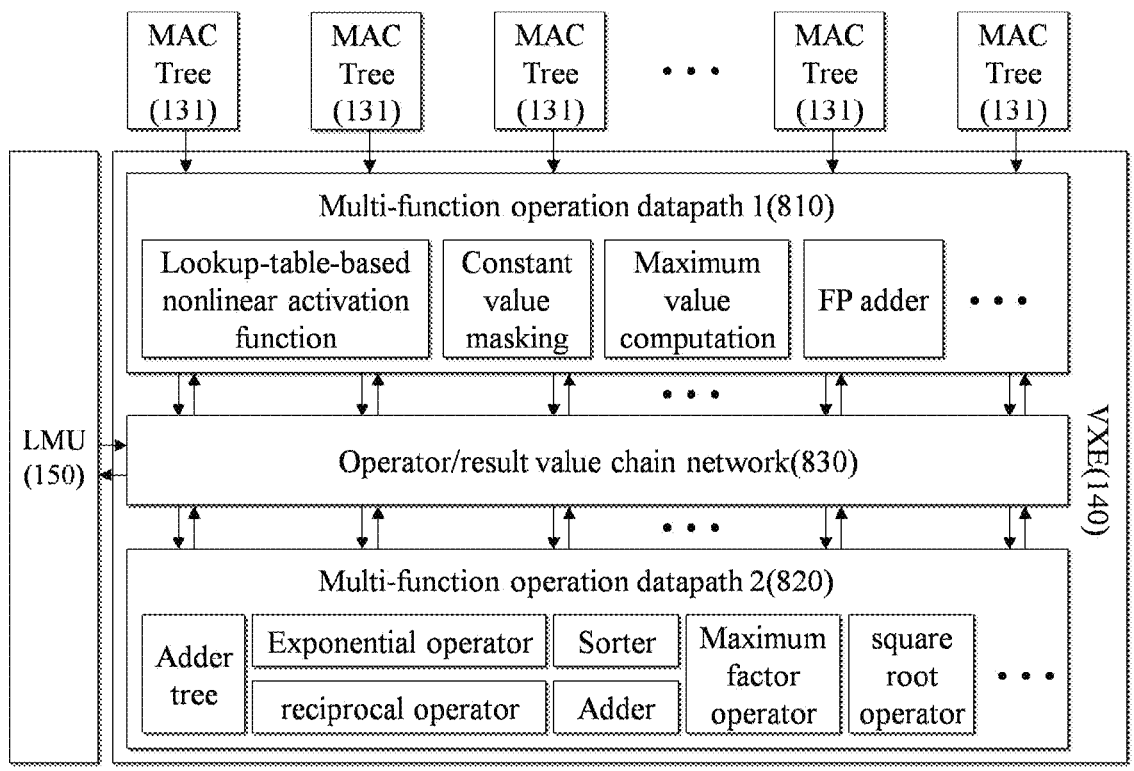
FIG. 8 illustrates an example of describing a reconfigurable multi-function operating device included in a latency processing unit according to an example embodiment.

FIG. 8 illustrates an example of describing a reconfigurable multi-function operating device included in a latency processing unit according to an example embodiment.

Referring to FIG. 8, the VXE 140 may include a plurality of multi-function operation datapaths 810 and 820, and the plurality of multi-function operation datapaths 810 and 820 may configure various operator combinations through connection to an operator/result value chain network 830.

As shown in FIG. 8, the plurality of multi-function operation datapaths 810 and 820 may include various operating devices required for, for example, a lookup-table-based nonlinear activation function, a masking operation and the like. However, the configuration of operating devices of the reconfigurable multi-function operation datapaths 810 and 820 is an example only and any additional operating device required for a large model operation may be included in the multi-function operation datapaths 810 and 820. An operation result by the VXE 140 may be delivered to the LMU 150.

Figure 9:
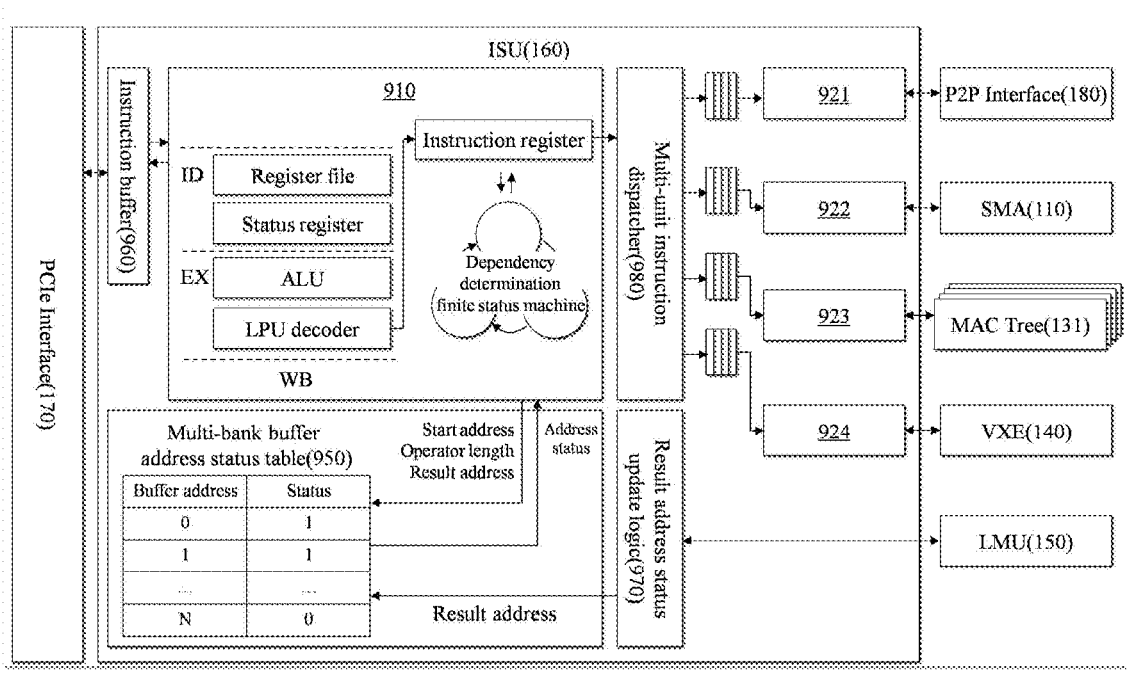
FIG. 9 illustrates an example of describing a configuration of an address-based out-of-order multi-unit scheduler included in a latency processing unit according to an example embodiment.

FIG. 9 illustrates an example of describing a configuration of an address-based out-of-order multi-unit scheduler included in a latency processing unit according to an example embodiment.

Referring to FIG. 9, the ISU 160 as the address-based out-of-order multi-unit scheduler included in the LPU 100 according to the example embodiment may include an address-based instruction dependency decision and scheduling controller 910, a plurality of instruction issue controllers 921, 922, 923, and 924, a multi-bank buffer address status table 950, an instruction buffer 960, a result address status update logic 970, and a multi-unit instruction dispatcher 980.

The ISU 160 may simultaneously operate operating devices and data transfer units through the address-based instruction dependency decision and scheduling controller 910 and the plurality of instruction issue controllers 921, 922, 923, and 924. Here, the ISU 160 may change a status for an operator address and a result address of the multi-bank buffer address status table 950 for an instruction performed in each operating device to 1.

The multi-bank buffer address status table 950 may change a status of a result address of a completed instruction through the result address status update logic 970 to 0.

The address-based instruction dependency decision and scheduling controller 910 may determine dependency between an instruction to be executed and an instruction being executed and dependency between instructions to be executed by referring to an address status through the multi-bank buffer address status table 970. Through this, since an instruction without dependency may be processed in advance, an idle time of each operating device and data transfer unit may be minimized.

The address-based instruction dependency decision and scheduling controller 910 included in the ISU 160 may load and process an instruction from the instruction buffer 960. Here, the address-based instruction dependency decision and scheduling controller 910 may execute a loop instruction and may decode other instructions and classify the instructions and then may deliver the same to the device-to-device (D2D) instruction issue controller 921, the direct memory access instruction issue controller 922, the MAC tree instruction issue controller 923, and the reconfigurable multi-function operating device instruction issue controller 924 through the multi-unit instruction dispatcher 980.

The ISU 160 may receive and store instructions of the LPU 100 from the host computer through the PCIe interface 170 and may store a current status of the LPU 100 in a register. The host computer may verify a corresponding status register through the PCIe interface 170.

Meanwhile, a weight of artificial intelligence is learned in advance and retrieved from an external memory to process an operation when performing inference of an artificial intelligence model. Therefore, if there is no need to process the weight in runtime, the weight may be maximally optimized in advance and then delivered to hardware that processes inference of the artificial intelligence model. The example embodiments may provide a memory mapping method and system for giant generative artificial intelligence hardware.

The artificial intelligence hardware needs to determine which one among input, weight, and output is to be reused for an operation. For example, in the case of a transformer-based model, since the weight may not be reused for inference, it is necessary to determine which one between input and output is to be reused to reduce hardware latency and to perform an efficient operation.

Also, it is necessary to determine whether there is an inefficient operation when performed in runtime and to verify whether this operation may be processed for mapping. Quantization may also need to be performed using distribution or maximum value and/or a minimum value of parameters.

The memory mapping method and system according to example embodiments is implemented with focus on reducing hardware latency. The transformer structure in which output of a current operation is connected to input of a next operation may not use methods of improving operator utilization, such as out-of-order. Therefore, a method capable of quickly producing a final result value and more quickly processing a next operation needs to be adopted. The example embodiments perform a next operation using a method of quickly producing a final sum based on an output reuse memory mapping method, which leads to improving operator efficiency.

Also, proposed is mapping methodology when using the same weight in different manners, such as a token embedding operation and a language modeling (LM) head operation. Since the LM head operation relates to matrix multiplication and the token embedding operation relates to reading a vector of a specific address, mapping methods need to be different. However, mutual weight data itself is the same. Therefore, if the weight data is differently mapped to an external memory, duplicate data will be written and the external memory may not be used efficiently. To solve this, proposed is a method of performing token embedding in a matrix multiplication mapping method.

Also, an example embodiment may provide a dedicated mapping method to reduce hardware routing complexity that may occur in rotary embedding. The weight memory mapping method and system according to the example embodiment may eliminate routing in advance during weight memory mapping, thereby reducing related latency in runtime hardware.

Figure 10:
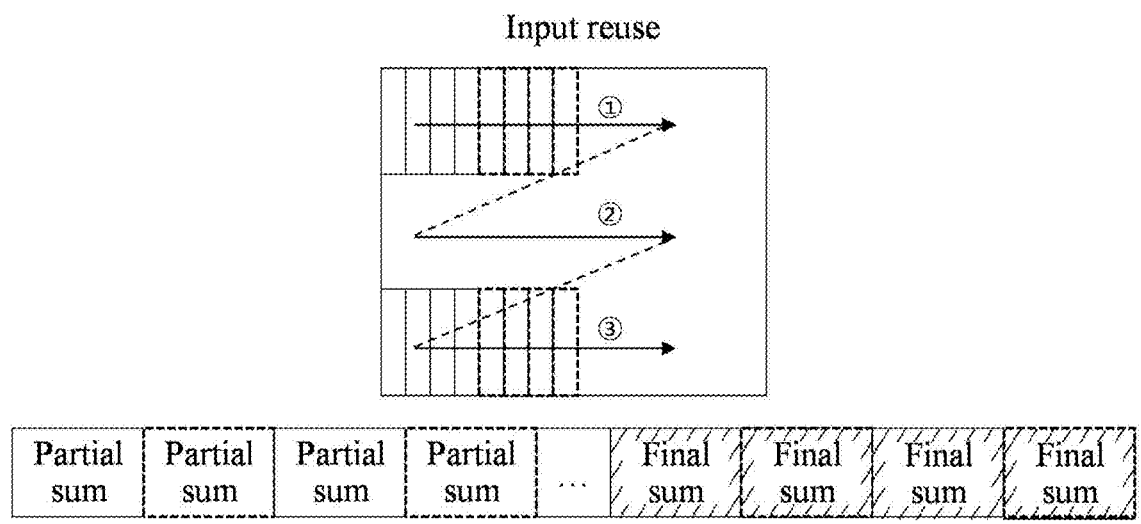
FIGS. 10 and 11 illustrate examples of describing the concept of input reuse and partial sum (output) reuse according to an example embodiment.
Figure 11:
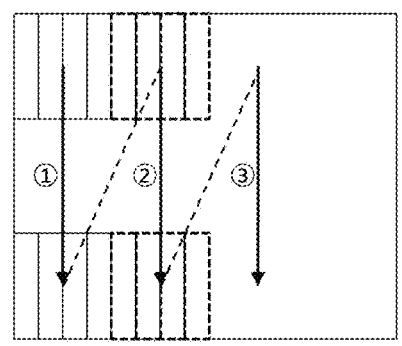

FIGS. 10 and 11 illustrate examples of describing the concept of input reuse and partial sum (output) reuse according to an example embodiment. When placing a weight, whether to retrieve input once and reuse the same or whether to store output once and reuse the same may be determined. In the case of reusing input as shown in FIG. 10, the number of partial sums increases by the number of rows, so FIFO resources equal to the number of rows need to be used. In contrast, in the case of reusing a partial sum as shown in FIG. 11, resources need to be used to store input data equal to the number of columns in a register. That is, no matter which method of both is used, hardware resource usage is the same since a size of rows and a size of columns are generally the same in the transformer. However, there is a difference as to when a final result is produced. While reusing input allows final sums to computed last and sequentially, reusing a partial sum allows a final sum to be quickly computed. Since example embodiments aim to reduce latency, it is better to compute the final sum as quickly as possible. For example, if there is an operator that does not participate in an operation, a next operation may be performed in advance using an earlier computed final sum.

Figure 12:
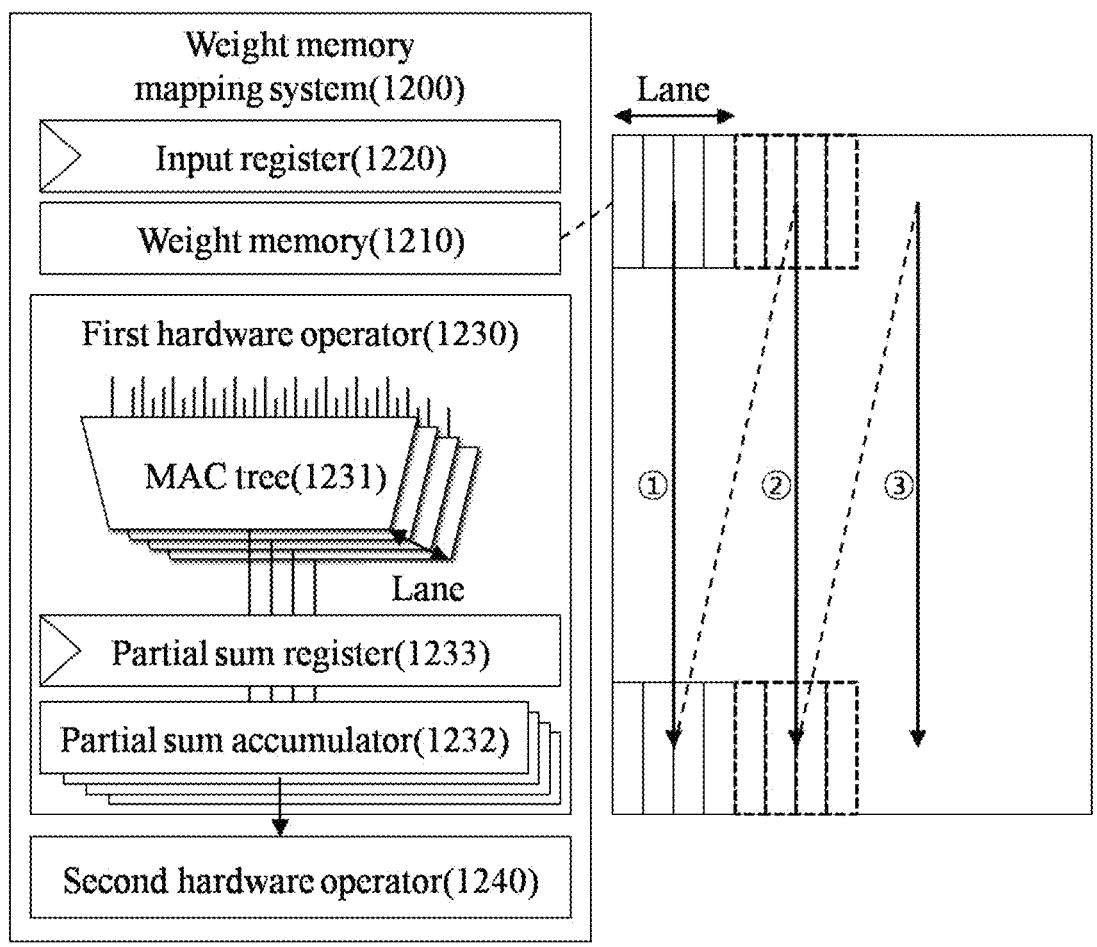
FIG. 12 illustrates an example of a weight memory mapping system based on partial sum reuse according to an example embodiment.

FIG. 12 illustrates an example of a weight memory mapping system based on partial sum reuse according to an example embodiment. A weight memory mapping system 1200 may include a weight memory 1210, an input register 1220, and a first hardware operator 1230. Here, the first hardware operator 1230 may correspond to the aforementioned LPU 100. Also, the weight memory 1210 may correspond to the HBM 200 as a memory that stores a weight matrix of a pretrained artificial intelligence model. It is described above that the register is required to store input data equal to the number of columns (number of columns of the weight matrix) for partial sum reuse. The input register 1220 may correspond to the register for storing such input data.

The example embodiment of FIG. 12 shows an example in which the number of lanes is 4. To this end, the first hardware operator 1230 may include four MAC trees 1231 and four partial sum accumulators 1232 and may further include a partial sum register 1233 configured to store a partial sum. The first hardware operator 1230 may read data of the weight memory 1210 with streamline, may immediately compute partial sums through the MAC trees 1231 and store the same in the partial sum register 1233, and may quickly compute final sums in the middle of a matrix multiplication operation by accumulating the partial sums through the partial sum accumulator 1232. As such, as shown in FIG. 11, the final sums are quickly computed in the middle rather than last of the operation. Therefore, if there is a second hardware operator 1240 that does not participate in the operation, the second hardware operator 1240 may be provided with an earlier computed final sum from the partial sum accumulator 1232 and may perform a next operation in advance using the provided final sum, which may lead to reducing hardware latency. For example, the second hardware operator 1240 may correspond to another LPU.

Figure 13:
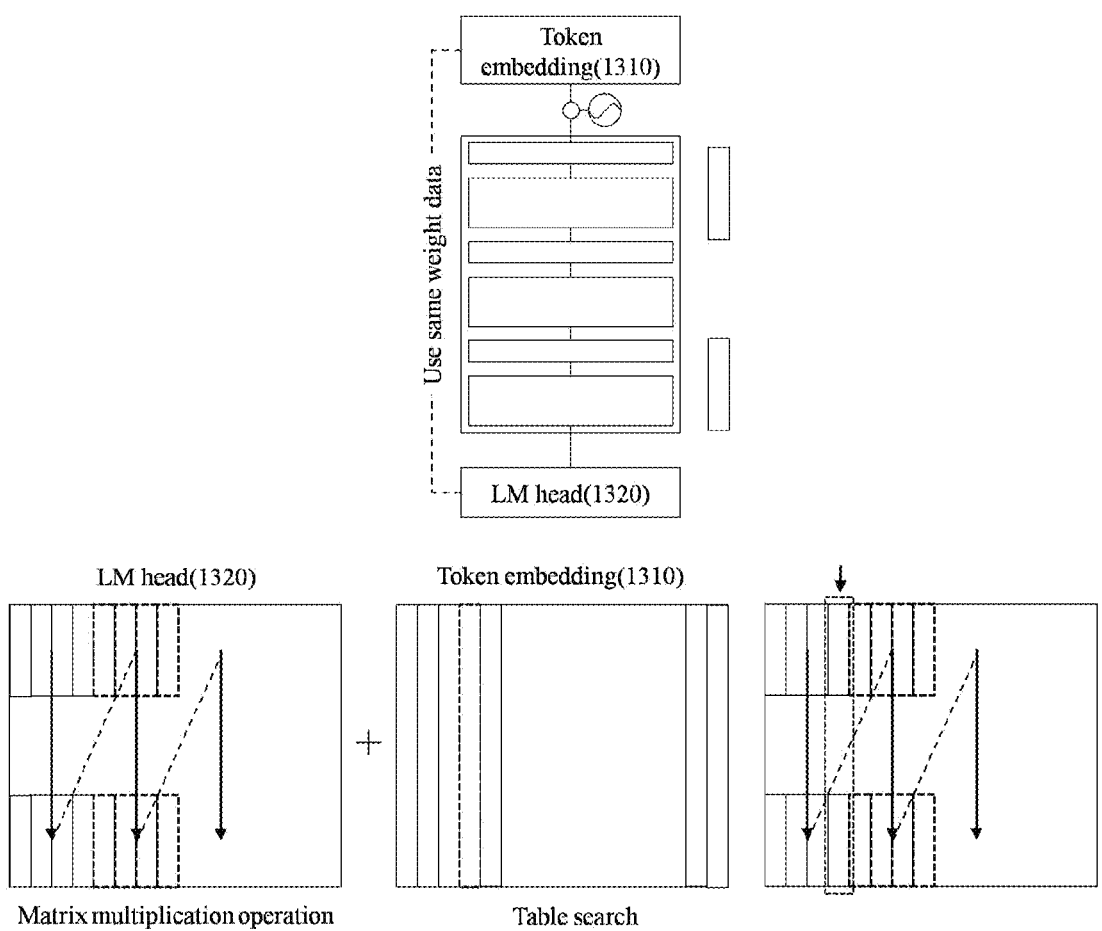
FIG. 13 illustrates an example of data deduplication according to an example embodiment.

FIG. 13 illustrates an example of data deduplication according to an example embodiment. A transformer includes an operation of token embedding 1310 and an operation of LM head 1320. In the example embodiment of FIG. 13, since the transformer itself is already well known, only the operation of the token embedding 1310 and the operation of the LM head 1320 are shown. The operation of the token embedding 1310 and the operation of the LM head 1320 share weight data. That is, a matrix multiplication operation may be performed by storing the weight data in only one place in the HBM 200, by reading a vector in a corresponding address when performing the operation of the token embedding 1310, and by using a weight when performing the operation of the LM head 1320. However, in the case of performing different operations with the same data as above, a GPU may consider the data as different data and may redundantly store the weight data in the HBM 200, which leads to wasting of the HBM 200.

The example embodiment may also process the token embedding 1310 in memory mapping for matrix multiplication. As shown in FIG. 13, when processing memory mapping with a partial sum reuse method, it can be seen that data is gathered in a single line (a single column). Therefore, when performing the token embedding 1310, necessary weight data may be easily read by simply determining which column of which lane is to read the weight data from. In this case, although the bandwidth of the HBM 200 is not completely used, data may not be redundantly stored and memory wasting may be reduced accordingly.

Figure 14:
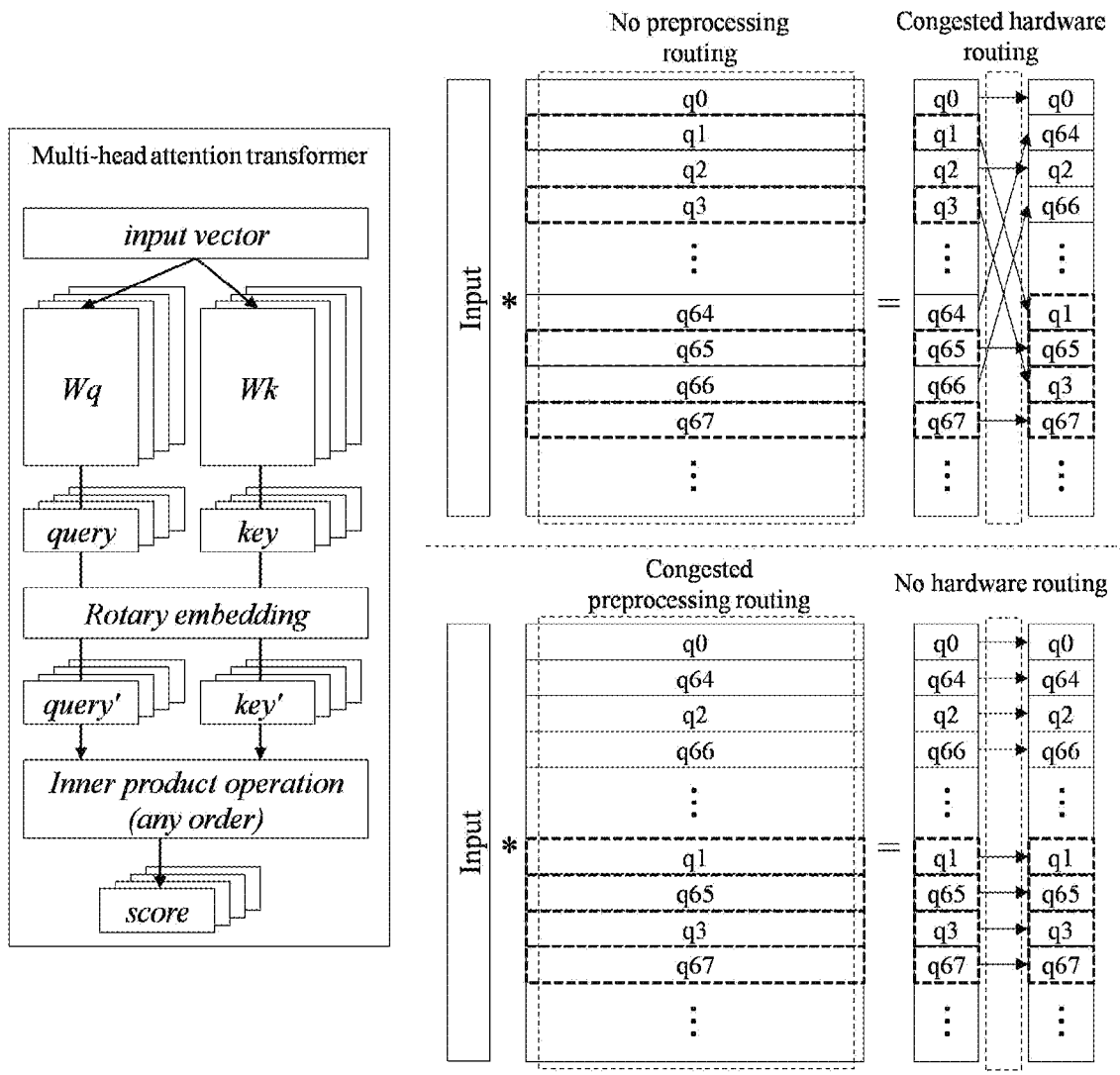
FIG. 14 illustrates an example of processing a matrix multiplication operation according to an example embodiment.

FIG. 14 illustrates an example of processing a matrix multiplication operation according to an example embodiment. The example embodiment describes an example of a rotary embedding operation, but is not limited thereto. In the case of rotary embedding, after performing a matrix multiplication operation, an operation between values that are far away from each other in the weight matrix is processed, such as an operation between a value of number 0 and a value of number 64 and an operation between a value of number 1 and a value of number 65. When implementing this in hardware, it may make hardware routing complex. In addition, if values to be operated are too far away from each other, it may make streaming processing difficult.

Therefore, by changing positions of values of the weight matrix at a compiler level, an operation between adjacent data may be processed without complex hardware routing. Preprocessing routing occurs during a preprocessing process, but hardware routing may be eliminated in runtime, which may provide hardware benefits.

Also, although the order between values of the weight matrix is arbitrarily changed, a next operation is an inner product operation that does not depend on order and there is no routing overhead in runtime.

Figure 15:
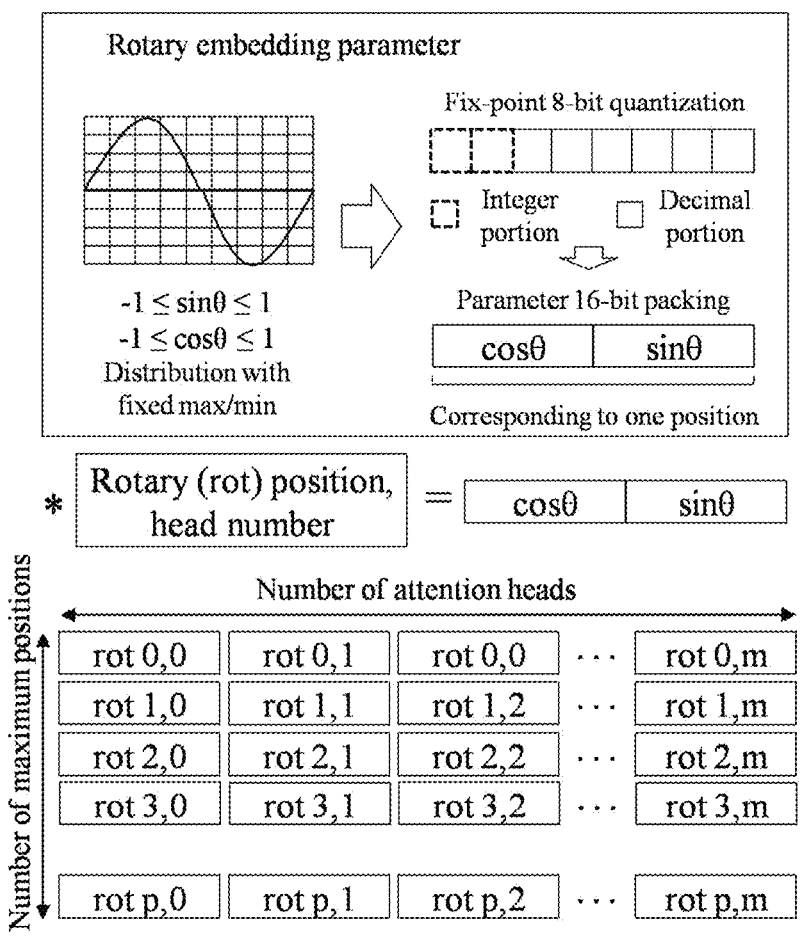
FIGS. 15 and 16 illustrate examples of a process of processing a rotary embedding operation according to an example embodiment.
Figure 16:
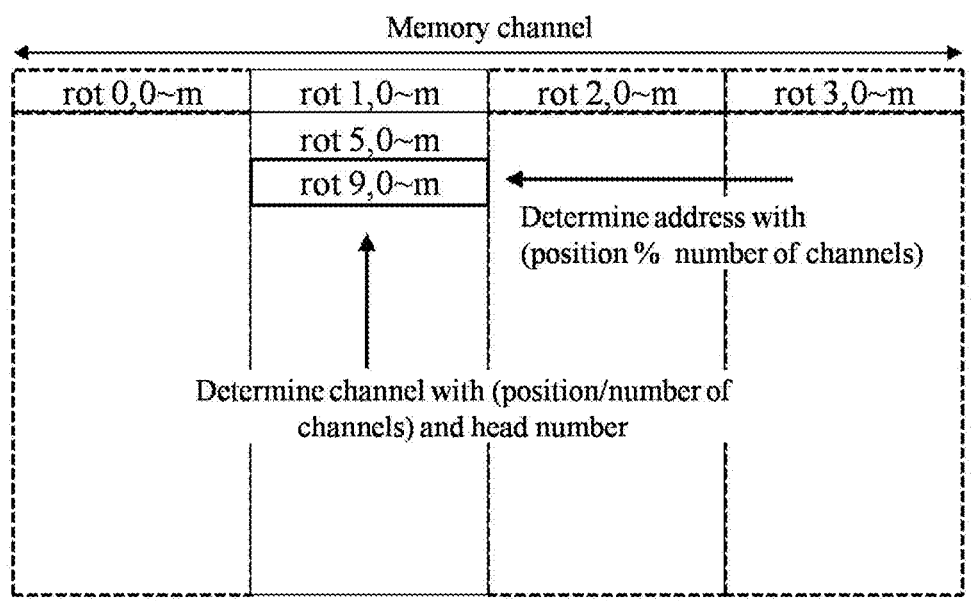
Figure 16:

FIGS. 15 and 16 illustrate examples of a process of processing a rotary embedding operation according to an example embodiment. A rotary embedding operation performs a sine (sin) operation and a cosine (cos) operation. However, since the result of the sine operation and the cosine operation ranges from −1 to 1, it is not efficient to use general floating point 16 bits (float16). It is verified that there is no issue with operation accuracy even after performing quantization with fixed-point 8 bits using a source code level simulator. Therefore, the example embodiment may reduce memory usage by packing two 8 bits and by using a sine value and a cosine value grouped as a single set with 16 bits. Also, as many sine values and coin values as the number of heads and the number of positions are present. When storing them in a memory such as the HBM 200 and then reading the same, a desired value may be read by determining a memory channel and an address.

Figure 17:
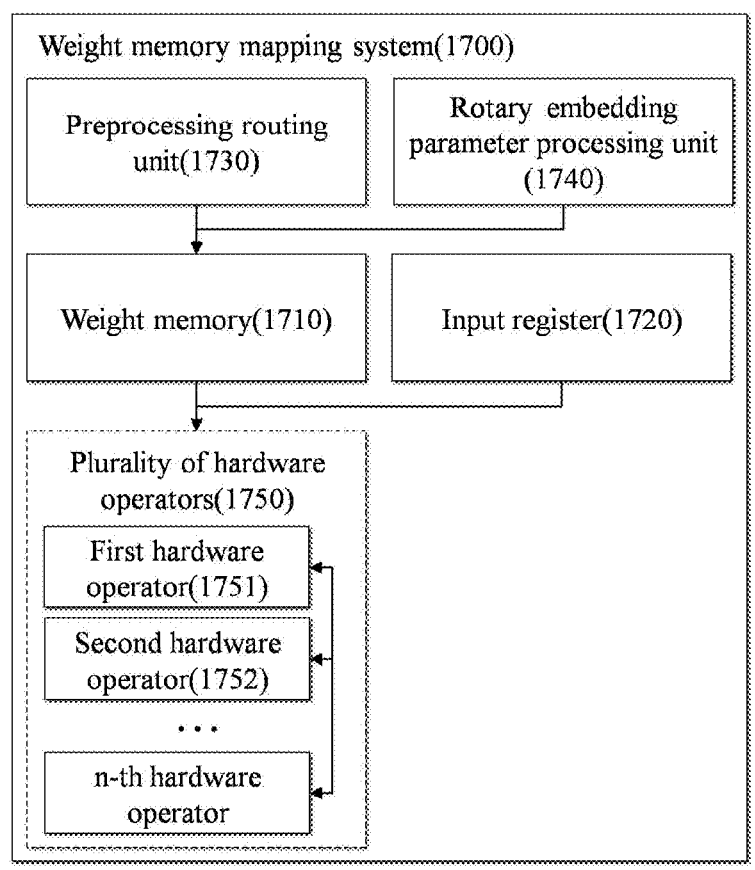
FIG. 17 is a block diagram illustrating an example of an internal configuration of a weight memory mapping system according to an example embodiment.
Figure 18:
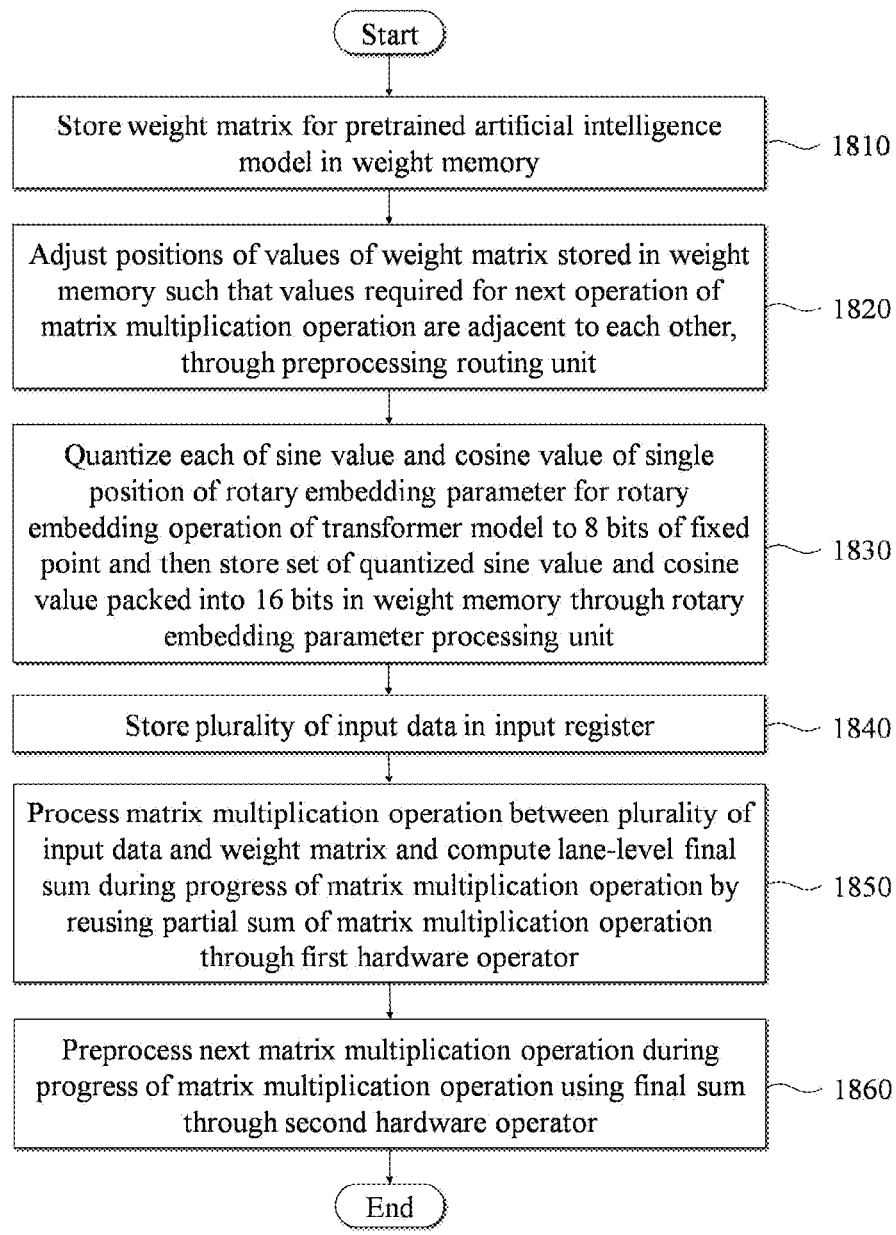
FIG. 18 is a flowchart illustrating an example of a weight memory mapping method according to an example embodiment.

FIG. 17 is a block diagram illustrating an example of an internal configuration of a weight memory mapping system according to an example embodiment, and FIG. 18 is a flowchart illustrating an example of a weight memory mapping method according to an example embodiment.

A weight memory mapping system 1700 according to the example embodiment may include a weight memory 1710, an input register 1720, a preprocessing routing unit 1730, a rotary embedding parameter processing unit 1740, and a plurality of hardware operators 1750. Depending on example embodiments, the weight memory 1710 may be a set of weight memories respectively for the plurality of hardware operators 1750. For example, each of the weight memories may correspond to the aforementioned HBM 200. Also, depending on example embodiments, at least some of components included in the weight memory mapping system 1700 may be implemented as physically different hardware devices. For example, each of the plurality of hardware operators 1750 may be implemented as an individual hardware device, and the weight memory 1710, the input register 1720, the preprocessing routing unit 1730, and the rotary embedding parameter processing unit 1740 may be implemented as still another hardware device. The hardware devices may be connected over a network and may communicate with each other. Also, at least some of the components may be excluded from the weight memory mapping system 1700, or an additional component may be further included. For example, for an example embodiment of not processing a rotary embedding operation for a transformer model, the rotary embedding parameter processing unit 1740 may be excluded from the weight memory mapping system 1700. As another example, the weight memory mapping system 1700 may further include an input/output (I/O) interface for connection to an I/O device or may further include a communication interface.

In operation 1810, the weight memory mapping system 1700 may store a weight matrix for a pretrained artificial intelligence model in the weight memory 1710. Here, the weight matrix stored in weight memory 1710 may be a portion of the entire weight matrices of the artificial intelligence model. For example, in the case of separating the giant artificial intelligence model into a plurality of partitions and processing the same through a plurality of LPUs, weight memories for the respective plurality of LPUs may be present and a weight matrix to be processed in each LPU may be stored in a weight memory corresponding to a corresponding LPU. In the example embodiment, the weight memory 1710 may store a weight matrix for a first hardware operator 1751 that is one of the plurality of hardware operators 1750.

In operation 1820, the weight memory mapping system 1700 may adjust positions of values of the weight matrix stored in the weight memory 1710 such that values required for a next operation of the matrix multiplication operation are adjacent to each other, through the preprocessing routing unit 1730. For example, when the artificial intelligence model is a transformer model, the next operation may include a rotary embedding operation for the transformer model, but is not limited thereto. If an operation after the matrix multiplication operation requires an operation between scattered values, the weight memory mapping system 1700 may adjust positions of values of the weight matrix in advance for the corresponding operation. Depending on example embodiments, operation 1820 may be omitted.

In operation 1830, the weight memory mapping system 1700 may quantize each of a sine value and a cosine value of a single position of a rotary embedding parameter for a rotary embedding operation of the transformer model to 8 bits of a fixed point and then store a set of the quantized sine value and cosine value packed into 16 bits in the weight memory 1710 through the rotary embedding parameter processing unit 1740. In this case, the rotary embedding parameter processing unit 1740 may store the set in the weight memory 1710 according to a channel that is determined using a value acquired by dividing a position of the set by the number of channels and a head number and an address that is determined using a remainder acquired by dividing the position of the set by the number of channels or may read the set from the weight memory 1710. This operation 1830 is for the rotary embedding operation of the transformer model and may be omitted depending on example embodiments. Also, the order of operations 1820 and 1830 may be changed.

In operation 1840, the weight memory mapping system 1700 may store a plurality of input data in the input register 1720. For partial sum reuse, a matrix multiplication operation between the plurality of input data and each column of the weight matrix may sequentially occur. Therefore, since the plurality of input data is repeatedly used as many as the number of columns of the weight matrix, the weight memory mapping system 1700 may store the plurality of input data in the input register 1720.

In operation 1850, the weight memory mapping system 1700 may process a matrix multiplication operation between the plurality of input data and the weight matrix and may compute a lane-level final sum during the progress of the matrix multiplication operation by reusing a partial sum of the matrix multiplication operation through the first hardware operator 1751. Here, the first hardware operator 1751 may correspond to the first hardware operator 1230 of FIG. 12. That is, the first hardware operator 1751 may include a plurality of MAC trees 1231 configured to process a lane-level matrix multiplication operation, a partial sum register 1233 configured to store the partial sum of the matrix multiplication operation, and a plurality of partial sum accumulators 1232 configured to compute the lane-level final sum by accumulating partial sums of the partial sum register 1233. Here, each of the number of the plurality of MAC trees 1231 and the number of the plurality of partial sum accumulators 1232 may correspond to the number of lanes. For example, if the number of lanes is 4, each of the number of the plurality of MAC trees 1231 and the number of the plurality of partial sum accumulators 1232 may be 4. Meanwhile, the partial sum may include a result of matrix multiplication between a single column of the weight matrix and the plurality of input data. Also, the lane-level final sum may include a value of accumulated partial sums as a result of matrix multiplication between each of lane-level columns of the weight matrix and the plurality of input data.

In operation 1860, the weight memory mapping system 1700 may preprocess a next matrix multiplication operation during the progress of the matrix multiplication operation using the final sum through the second hardware operator 1752. The second hardware operator 1752 may be an operator that does not participate in a current operation among the plurality of hardware operators 1750. That is, the weight memory mapping system 1700 may deliver a quickly computed final sum to the second hardware operator 1752 as an operator that does not participate in a current operation and may preprocess the next operation. Here, the second hardware operator 1752 may preprocess the next operation using the lane-level final sum computed by at least one of the plurality of partial sum accumulators 1232.

Also, depending on example embodiments, when the artificial intelligence model is a transformer model, an LM head operation and a token embedding operation for the transformer model may share weight data. To this end, in operation 1810, the weight memory mapping system 1700 may store the shared weight data in the weight memory 1710 as the weight matrix. Also, in operation 1850, when performing the token embedding operation through the first hardware operator 1751, the weight memory mapping system 1700 may read a weight of a specific column of the weight memory 1710 and may process the token embedding operation. For example, it is described above that the VXE 140 included in the LPU 100 may execute a vector operation, such as token embedding, softmax, normalization, and residual operation.

According to some example embodiments, it is possible to provide a weight memory mapping method and system for a streaming operation of a giant generative artificial intelligence hardware.

Although the example embodiments are described above with reference to the accompanying drawings, it will be understood by one of ordinary skill in the art that the present invention can be implemented in other specific forms without changing technical spirit or essential features of the invention. Therefore, the example embodiments should be understood in all respects as illustrative and not construed as limiting.

What is claimed is:

1. A weight memory mapping system comprising:
a weight memory configured to store a weight matrix for a pretrained artificial intelligence model;
an input register configured to store a plurality of input data;
a first hardware operator configured to process a matrix multiplication operation between the plurality of input data and the weight matrix and to compute a lane-level final sum during the progress of the matrix multiplication operation by reusing a partial sum of the matrix multiplication operation; and
a second hardware operator configured to preprocess a next matrix multiplication operation during the progress of the matrix multiplication operation using the final sum.

2. The weight memory mapping system of claim 1, wherein the partial sum includes a result of matrix multiplication between a single column of the weight matrix and the plurality of input data, and
the lane-level final sum includes a value of accumulated partial sums as a result of matrix multiplication between each of lane-level columns of the weight matrix and the plurality of input data.

3. The weight memory mapping system of claim 1, wherein the first hardware operator comprises:
a plurality of multiply-and-accumulation (MAC) trees configured to process the matrix multiplication operation based on the lane level;
a partial sum register configured to store the partial sum of the matrix multiplication operation; and
a plurality of partial sum accumulators configured to accumulate partial sums of the partial sum register and to compute the lane-level final sum.

4. The weight memory mapping system of claim 3, wherein each of the number of the plurality of MAC trees and the number of the plurality of partial sum accumulators corresponds to the number of lanes.

5. The weight memory mapping system of claim 3, wherein the second hardware operator is configured to preprocess the next matrix multiplication operation using the lane-level final sum that is computed by at least one partial sum accumulator among the plurality of partial sum accumulators.

6. The weight memory mapping system of claim 1, wherein the artificial intelligence model includes a transformer model,
the weight memory is configured to store shared weight data for a language modeling (LM) head operation and a token embedding operation for the transformer model as the weight matrix, and
the first hardware operator is configured to read a weight of a specific column of the weight matrix and process the token embedding operation when performing the token embedding operation.

7. The weight memory mapping system of claim 1, further comprising:
a preprocessing routing unit configured to adjust positions of values of the weight matrix stored in the weight memory before the matrix multiplication operation such that values required for a next operation of the matrix multiplication operation are adjacent to each other.

8. The weight memory mapping system of claim 7, wherein the artificial intelligence model includes a transformer model, and
the next operation includes a rotary embedding operation for the transformer model.

9. The weight memory mapping system of claim 1, wherein the artificial intelligence model includes a transformer model, and
the weight memory mapping system further comprises:
a rotary embedding parameter processing unit configured to quantize each of a sine value and a cosine value of a single position of a rotary embedding parameter for a rotary embedding operation of the transformer model to 8 bits of a fixed point and then store a set of the quantized sine value and cosine value packed into 16 bits in the weight memory.

10. The weight memory mapping system of claim 9, wherein the rotary embedding parameter processing unit is configured to store the set in the weight memory according to a channel that is determined using a value acquired by dividing a position of the set by the number of channels and a head number and an address that is determined using a remainder acquired by dividing the position of the set by the number of channels or to read the set from the weight memory.

11. A weight memory mapping method comprising:
storing a weight matrix for a pretrained artificial intelligence model in a weight memory;
storing a plurality of input data in an input register;
processing a matrix multiplication operation between the plurality of input data and the weight matrix and computing a lane-level final sum during the progress of the matrix multiplication operation by reusing a partial sum of the matrix multiplication operation through a first hardware operator; and
preprocessing a next matrix multiplication operation during the progress of the matrix multiplication operation using the final sum through a second hardware operator.

12. The weight memory mapping method of claim 11, wherein the partial sum includes a result of matrix multiplication between a single column of the weight matrix and the plurality of input data, and
the lane-level final sum includes a value of accumulated partial sums as a result of matrix multiplication between each of lane-level columns of the weight matrix and the plurality of input data.

13. The weight memory mapping method of claim 11, wherein the first hardware operator comprises:
a plurality of multiply-and-accumulation (MAC) trees configured to process the matrix multiplication operation based on the lane level;
a partial sum register configured to store the partial sum of the matrix multiplication operation; and
a plurality of partial sum accumulators configured to accumulate partial sums of the partial sum register and to compute the lane-level final sum.

14. The weight memory mapping method of claim 11, wherein the artificial intelligence model includes a transformer model,
the storing comprises storing, in the weight memory, shared weight data for a language modeling (LM) head operation and a token embedding operation for the transformer model as the weight matrix, and
the computing of the final sum comprises reading a weight of a specific column of the weight matrix and processing the token embedding operation when performing the token embedding operation through the first hardware operator.

15. The weight memory mapping method of claim 11, further comprising:
adjusting positions of values of the weight matrix stored in the weight memory before the matrix multiplication operation such that values required for a next operation of the matrix multiplication operation are adjacent to each other.

16. The weight memory mapping method of claim 11, wherein the artificial intelligence model includes a transformer model, and
the weight memory mapping method further comprises:
quantizing each of a sine value and a cosine value of a single position of a rotary embedding parameter for a rotary embedding operation of the transformer model to 8 bits of a fixed point and then storing a set of the quantized sine value and cosine value packed into 16 bits in the weight memory.

* * * * *